C. McGUIRE.
CABLEWAY.
APPLICATION FILED MAY 29, 1916.
1,222,007.
Patented Apr. 10, 1917.
5 SHEETS—SHEET 1.
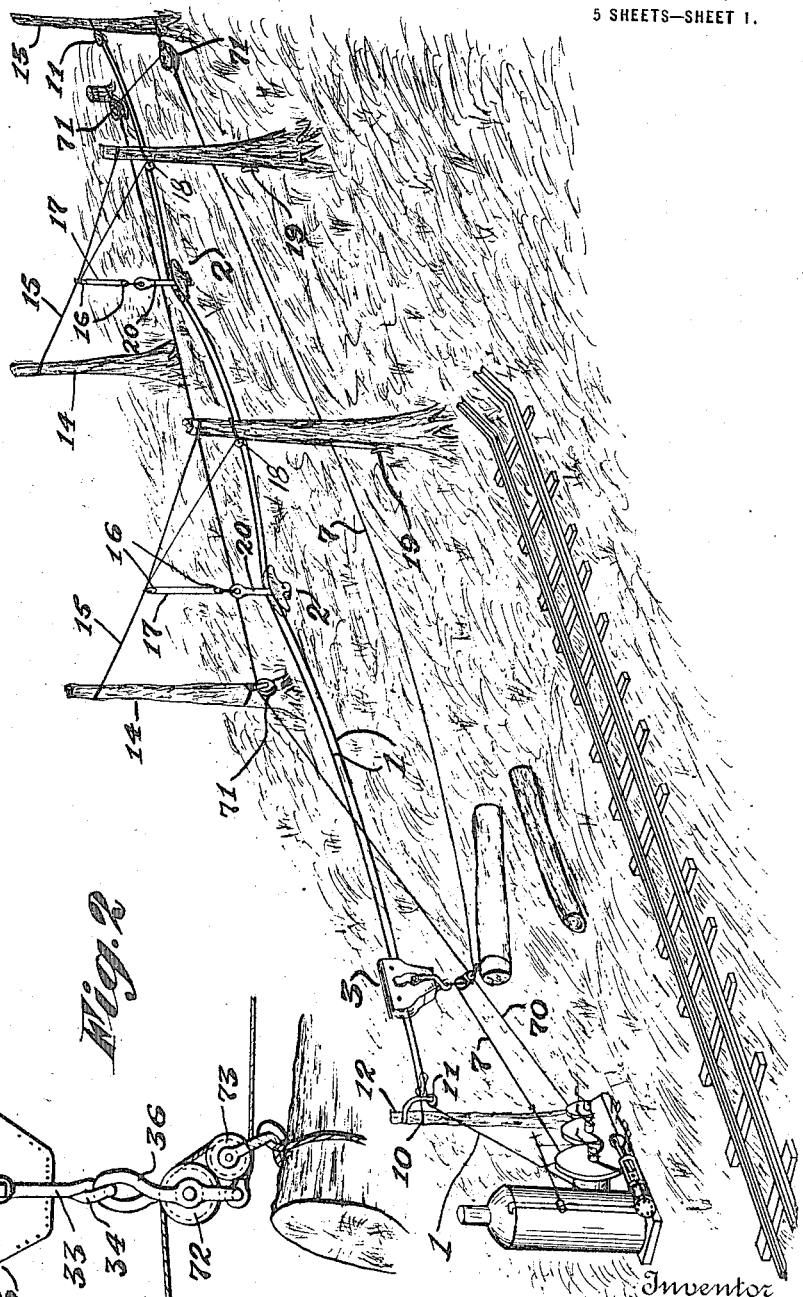

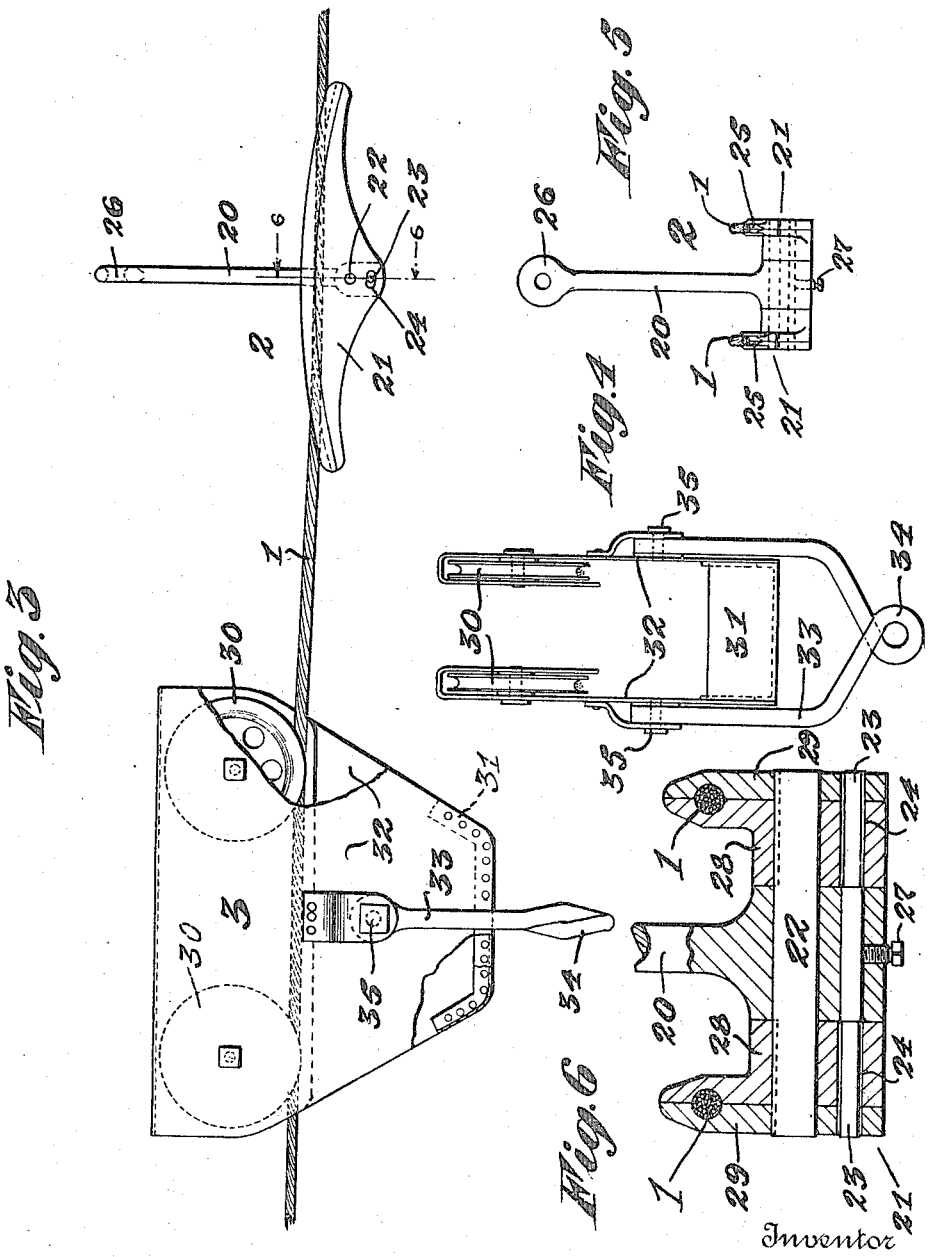

C. McGUIRE.
CABLEWAY.
APPLICATION FILED MAY 29, 1916.
1,222,007.
Patented Apr. 10, 1917.
5 SHEETS—SHEET 3.
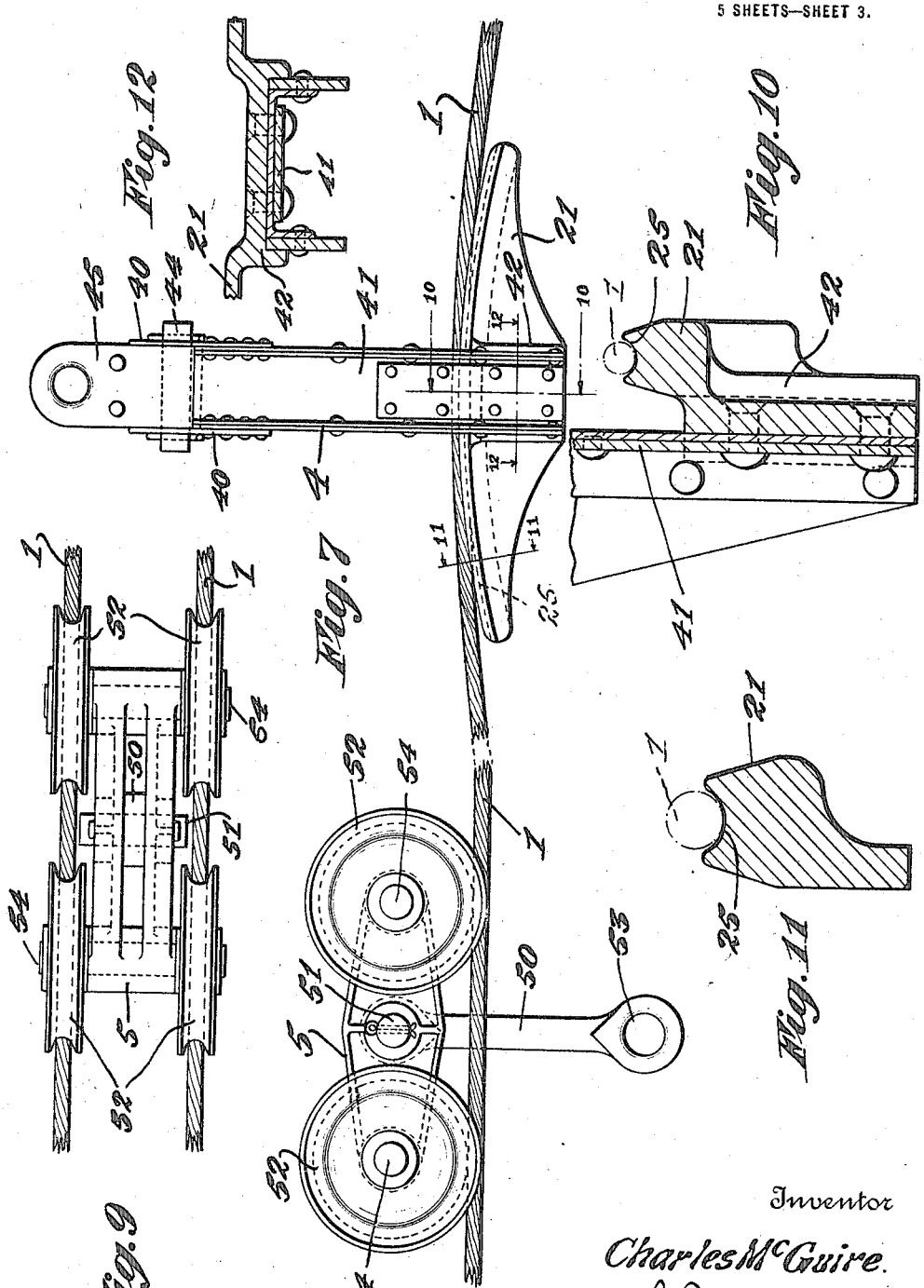
Inventor
Charles McGuire.
By Henry L. Reynolds.
Attorneys

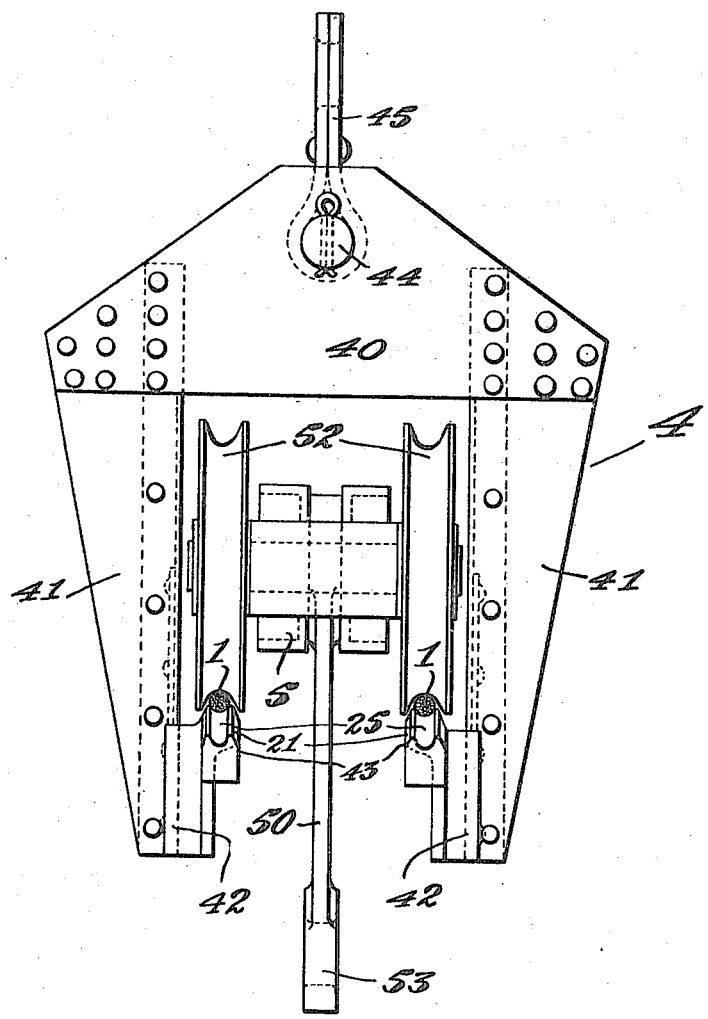

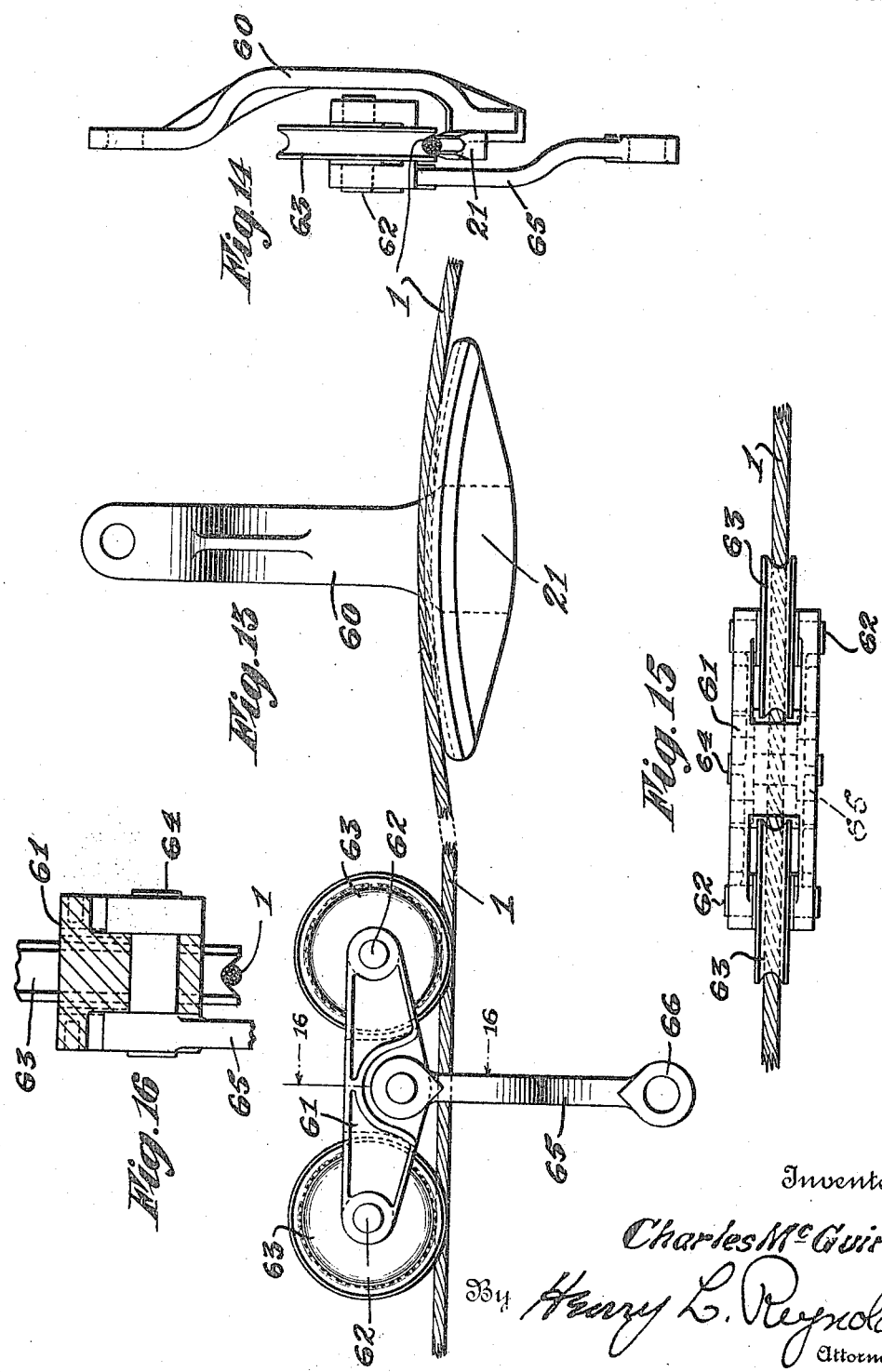

UNITED STATES PATENT OFFICE.

CHARLES McGUIRE, OF SEATTLE, WASHINGTON.

CABLEWAY.

1,222,007.
Specification of Letters Patent.
Patented Apr. 10, 1917.

Application filed May 29, 1916. Serial No. 100,600.

*To all whom it may concern:*

Be it known that I, CHARLES McGUIRE, citizen of the United States, and resident of Seattle, county of King, and State of Washington, have invented certain new and useful Improvements in Cableways, of which the following is a specification.

My invention relates to cableways and consists of an improvement by means of which supports may be provided for the trackway cable intermediate its head and tail supports and permit free movement of the carriage past these intermediate supports.

The object of my invention is to provide a cableway system which will permit the use of intermediate supports, thereby making it possible to greatly extend the working lengths of cableways, and at the same time to keep the size of the trackway cable within medium dimensions.

My invention comprises certain improvements of construction which will be hereinafter described and then particularly pointed out in the claims.

In the accompanying drawings I have shown my invention in the forms of construction which are now most preferred by me.

Figure 1 is a perspective showing diagrammatically the general features of an installation constructed in accordance with my invention.

Fig. 2 is a side view of a carriage and the connections therefrom to a load.

Fig. 3 is a side view of a carriage and one of the intermediate supporting members.

Fig. 4 is an end view of the carriage shown in Fig. 3.

Fig. 5 is an end view of the cable supporting mechanism shown in Fig. 3.

Fig. 6 is a section taken on the line 6—6 of Fig. 3.

Fig. 7 is a side view of a carriage and intermediate supporting mechanism in which the details of construction differ from that shown in Fig. 3 but involve the same principles.

Fig. 8 is an end view of the carriage and supporting mechanism as shown in Fig. 7.

Fig. 9 is a top plan view of the carriage upon the trackway cables.

Fig. 10 is a section taken on line 10—10 of Fig. 7.

Fig. 11 is a section taken on the line 11—11 of Fig. 7.

Fig. 12 is a section taken on the line of 12—12 of Fig. 7.

Fig. 13 is a side view of a carriage and one of the intermediate supporting mechanisms designed for use upon a single line cableway.

Fig. 14 is an end view of the carriage and intermediate supporting mechanism shown in Fig. 13.

Fig. 15 is a top plan view of the carriage shown in Fig. 13.

Fig. 16 is a section taken on the line 16—16 of Fig. 13.

My invention has been more particularly designed for application to cableways employed in logging, although it is evident that it may be applied to cableways employed in other work. I have described it as applied to logging, it being understood that it may be applied for any other work for which it is found suitable.

For such work wherein heavy loads are to be carried, as in the case in logging among the heavy timber of the Pacific Northwest, I prefer to use a trackway cable which is of medium size but which is so placed as to employ two lines thereof for the support of the carriage.

As shown in Fig. 1, one end of the trackway cable is secured at 10 to the head support 12 and extends thence to the tail support 13, where it passes through a sheave 11 and thence back to the head support 12, over a sheave 11 carried thereby and thence to the engine, or other means by which the cable may be held and slack taken up or let out.

Intermediate supports 14, which may consist of trees suitably placed at each side of the cableway or of masts which are suitably placed in similar relation thereto, are provided between the head and tail supports. The number of these will depend upon the total length of the cableway. These supporting masts or trees, are placed or selected in pairs adjoining to each other and at opposite sides of the course of the cableway, and are connected at a sufficient elevation above the ground by means of a cable 15. Secured to this cable at a point immediately above the cableway, is a sheave 16 which, in conjunction with a like sheave 16 between the same and the supporting cable 17, form a block and tackle, by means of which the intermediate supporting mechanism 2 is supported from the cable 15. The cable 17 is preferably lead through and passes over a pulley 18 carried by one of the trees or masts 14, and thence to a cleat 19, or other means by which the end is secured.

The intermediate supporting mechanism for the cableway is shown in one form in Figs. 3 to 6 inclusive. In the form therein shown, this consists of a central suspending bar 20, provided with an eye 26 at its upper end, by means of which it is connected with and supported by a block and tackle, and two cable supporting bars 21 which are secured at each side of the bar 20 and each of which is provided with a groove 25 in its upper edge, in which groove the cable is placed. These grooves form securing beds for the cable and hold it in place and prevent slipping off therefrom.

The bars 21 have their upper edges preferably slightly rounded in outline resembling an arc of a circle of considerable radius. This construction also has the bars 21 carried by the rod 20 through a pivot pin 22, whereby a slight rocking action may take place. I have also shown a pin 23 which is carried by the lower end of the arm 20 and which enters a slot 24 in the bar 21, whereby the angle of rocking of the bar 21 is limited.

In Fig. 6 a slight modification of structure is shown, in which the cable supporting bars are made of two pieces, 28 and 29, and these are provided with grooves for the reception of the cable, whereby this intermediate supporting member is clamped upon the cable. In this construction the device is not as conveniently removable to a new position upon the cable as is the device shown in Fig. 5, in which the cable merely rests in the grooves formed in the upper edges of the bars 20. This construction, however, secures it more firmly in place upon the cables.

The carriage 3 employed in connection with this type of cableway supporting means, has two side plates 32 spaced apart far enough to lie outside of the two lines of the cable 1. The running wheels 30 of the carriage are journaled at the inner sides of the plates 32 and the two wheels 30 are spaced apart a distance corresponding with the two lines of the cables 1. Plates 32 are connected at their bottom only by a plate 31. This construction leaves an ample space between the two sides of the carriage for the passage of the intermediate supporting mechanism 2. A yoke 33 is supported from the carriage by means of pivots 35 and at its lower end is provided with an eye 34 for the adjustment of the rope.

The modified construction shown in Figs. 7 to 12 inclusive, is reversed, in this respect; that the carriage is provided with a central depending arm 50 lying between the two cables 1, while the intermediate cable supporting device has two depending arms 41 extending outside of the cables. The cable supporting device 4 consists of a transversely extending head 40 and two depending arms 41 secured to the outer ends of the head. A pivot pin 44 extends through the head and has a clevis 45 mounted thereon by means of which the device may be supported in a flexible manner so that it can swing in any direction necessary.

The bars 21 as herein shown, are not pivoted upon the frame but are secured thereto fixedly by their base 42. The arms 21 are essentially the same as previously described being provided with a groove 25 extending lengthwise of their upper edges in which the cable 1 is bedded. The carriage employed in this type of construction consists of a skeleton frame 5, carrying two axles 54, upon which the four wheels 52 are mounted. The bar 50 is secured to the carriage by means of a shaft 51 and at its lower ends is provided with an eye 53 or other means by which the load may be conveniently secured thereto.

In Figs. 13 to 16 inclusive, a type of intermediate supporting mechanism for the cableway and a carriage to operate in conjunction therewith, is shown. In this form of construction, the cableway supporting device consists of a suspension bar 60 which is laterally bent to provide spaces for the passage of the carriage and has the bar 21 fixedly secured thereto. The carriage designed for use with this consists of a skeleton frame 61 carrying two studs 62, upon which are mounted the running wheels 63. Upon a pivoted pin 64 carried by the carriage, bar 65 is mounted, this having an eye 66 in its lower end for convenient adjustment of the load thereto. This bar is also laterally offset to bring its lower end into the vertical plane of the cable when its running wheels 63 are vertical.

By the use of mechanism of the type herein shown, it is possible to extend a cableway a great deal farther than where only head and tail supports are used. It is also possible to carry the same loads by the use of cables much smaller than would be necessary if the whole distance was comprised within one span. In the installation as shown in Fig. 1, a back-haul 70 would extend from the engine through guiding sheaves 71 secured to any convenient support, preferably at one side of the course of the cableway, and finally a guide sheave 71 carried by the tail support or other object substantially in line with the cableway, and is then secured to the carriage. The haul line 70 would, as usual, extend from the engine to and over a sheave 72, carried by the carriage and thence, either to the load direct, or over a sheave 73 and thence back to the connection with the frame of the sheave 72. The arrangements of these parts may be varied and are not essential parts of my present invention.

In operating my invention the carriage upon approaching one of the intermediate supporting devices, would ride over the same and pass along without any interference. By such means it is possible to greatly extend the range of operation of cableways for logging and to keep the parts thereof of more manageable sizes.

What I claim my invention is:

1. A cableway system comprising a two part trackway cable, anchorages for the ends of said cable, elevated supports spaced intermediate the ends of the cable, and cable supports each comprising an arm suspended from an elevated support and a bar pivoted upon the lower end of said arm to swing in a vertical plane and recessed for supporting engagement with the cable from beneath.

2. A cableway system comprising a two part trackway cable, anchorages for the ends of said cable, elevated supports spaced intermediate the ends of the cable, and cable supports each comprising an arm suspended from an elevated support and having a transversely extending head provided with a horizontally projecting pivot pin at each end, and a bar pivoted upon each pin and having a recessed upper surface adapted to receive a cable, and means for limiting the pivot action of said bars within small angles.

3. A cableway system comprising a trackway cable having adjacent and parallel outward and inward runs, elevated supports for the ends of the cableway, elevated supports spaced intermediate said end supports, cable suspending means comprising a bar suspended from said intermediate elevated supports and having transversely and horizontally extending pivot pins, a bar pivoted upon said pins at each side the suspending bar and having a longitudinal cable receiving groove in its upper edge and a cableway carriage having two upwardly extending arms and sheaves journaled on the inner sides of said arms and adapted to travel on the cableway.

4. A cableway system comprising a trackway cable having adjacent and parallel outward and inward runs, anchorages for the ends of the cableway, a carriage having two sets of wheels adapted to travel on the two parts of the cableway, elevated supports spaced intermediate the ends of the cableway, cable supports suspended from said elevated supports, said cable supports and the carriage having, one two arms spaced outside the cables and the other a central bar extending between the cables, and two bars rockingly pivoted upon the cable supports and longitudinally grooved to form seats for receiving the cables.

5. A cableway system comprising elevated head and tail supports, a trackway cable fixed by one end to the head support, a sheave on the tail support through which the cable passes, a sheave on the head support through which the other end of the cable passes, whereby two parallel runs are formed, and means for taking up and letting out the latter end of the cable, a carriage having running sheaves engaging both runs of the cable and means for traversing the carriage.

6. A cableway system comprising elevated head and tail supports, a trackway cable fixed by one end to the head support, a sheave on the tail support through which the cable passes, a sheave on the head support through which the other end of the cable passes, whereby two parallel runs are formed and means for taking up and letting out the latter end of the cable, supports for said cables intermediate the head and tail supports and having lateral and upwardly projecting parts having supporting engagement with the cables from below, a carriage having a set of running wheels engaging each run of the cable, said intermediate supposts and the carriage having one a single frame member located between the cables and the other two frame members located outside the cables, whereby the carriage may pass said intermediate support.

Signed at Seattle, Washington, this 23rd day of May, 1916.

CHARLES McGUIRE.

Copies of this patent may be obtained for five cents each, by addressing the "Commissioner of Patents, Washington, D. C."